(12) United States Patent
Fitze

(10) Patent No.: US 7,350,853 B2
(45) Date of Patent: Apr. 1, 2008

(54) FLOOR MODULE FOR A VEHICLE

(75) Inventor: Herbert Fitze, Waldowstrasse 3a, Berlin (DE) D-13156

(73) Assignee: Herbert Fitze, Berlin (DE)

( * ) Notice: Subject to any disclaimer, the term of this patent is extended or adjusted under 35 U.S.C. 154(b) by 0 days.

(21) Appl. No.: 10/495,231

(22) PCT Filed: Oct. 28, 2002

(86) PCT No.: PCT/DE02/04024

§ 371 (c)(1),
(2), (4) Date: Oct. 6, 2004

(87) PCT Pub. No.: WO03/045764

PCT Pub. Date: Jun. 5, 2003

(65) Prior Publication Data

US 2005/0040675 A1 Feb. 24, 2005

(30) Foreign Application Priority Data

Nov. 14, 2001 (DE) .................. 201 18 424 U

(51) Int. Cl.
*B60J 7/00* (2006.01)
*B61D 45/00* (2006.01)

(52) U.S. Cl. .................. 296/193.07; 296/184.1; 296/65.13; 410/104

(58) Field of Classification Search ............ 296/65.13, 296/193.07, 184.1; 410/104, 105
See application file for complete search history.

(56) References Cited

U.S. PATENT DOCUMENTS

| | | | | |
|---|---|---|---|---|
| 3,972,500 A | * | 8/1976 | Johnson et al. ............... 410/85 |
| 4,352,520 A | * | 10/1982 | Stiglmaier et al. .......... 296/204 |
| 5,054,843 A | * | 10/1991 | Gray .......................... 296/191 |
| 5,934,849 A | * | 8/1999 | Haire .......................... 410/113 |
| 6,179,369 B1 | * | 1/2001 | Bender et al. ........... 296/182.1 |
| 6,219,983 B1 | * | 4/2001 | Gr.ang.kjaar Jensen et al. .......................... 52/403.1 |
| 6,247,747 B1 | * | 6/2001 | Kawanomoto et al. ..... 296/191 |
| 6,427,962 B1 | * | 8/2002 | Rohee et al. ................ 248/424 |

* cited by examiner

Primary Examiner—Joseph D. Pape
(74) Attorney, Agent, or Firm—Fulbright & Jaworski; Jan K. Simpson

(57) ABSTRACT

The present invention is directed to a floor module for a vehicle having a floor plate, already cut to size and ready for installation, which is integrally connected to at least one mounting rail. The floor plate is preferable bonded to at least one mounting rail, which may be a seat runner for mounting seats. The floor plate can have at least one slot-shaped cut-out to receive at least one mounting rail or the floor plate can consist of a plurality of elements joined together into one part by a mounting rail arranged between them.

22 Claims, 5 Drawing Sheets

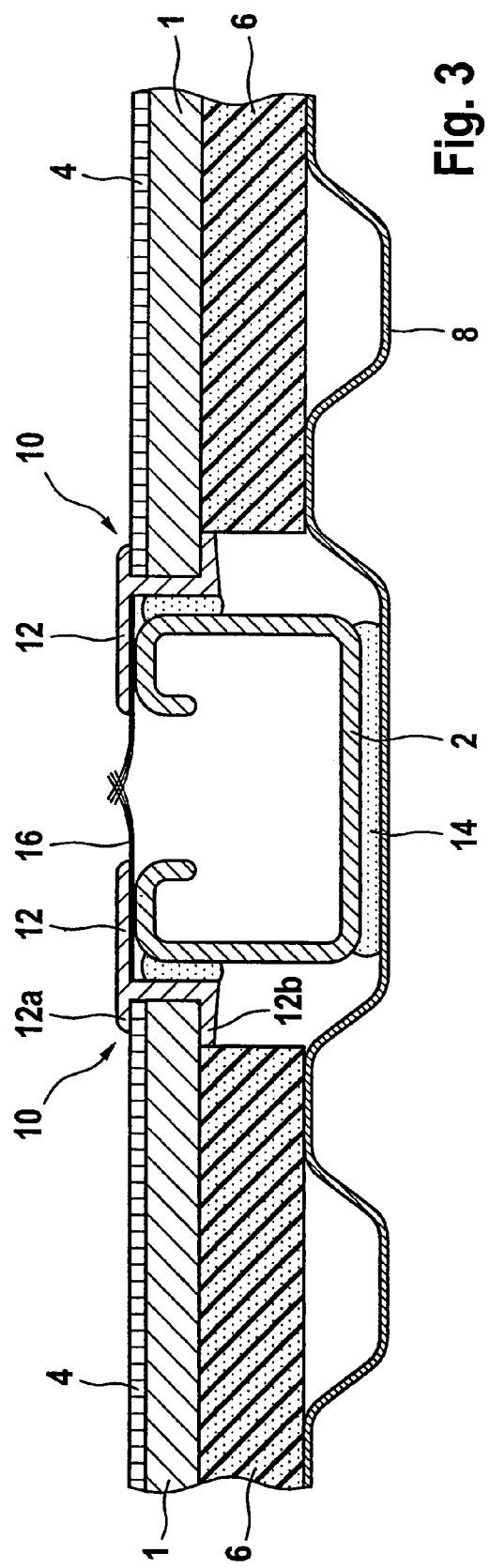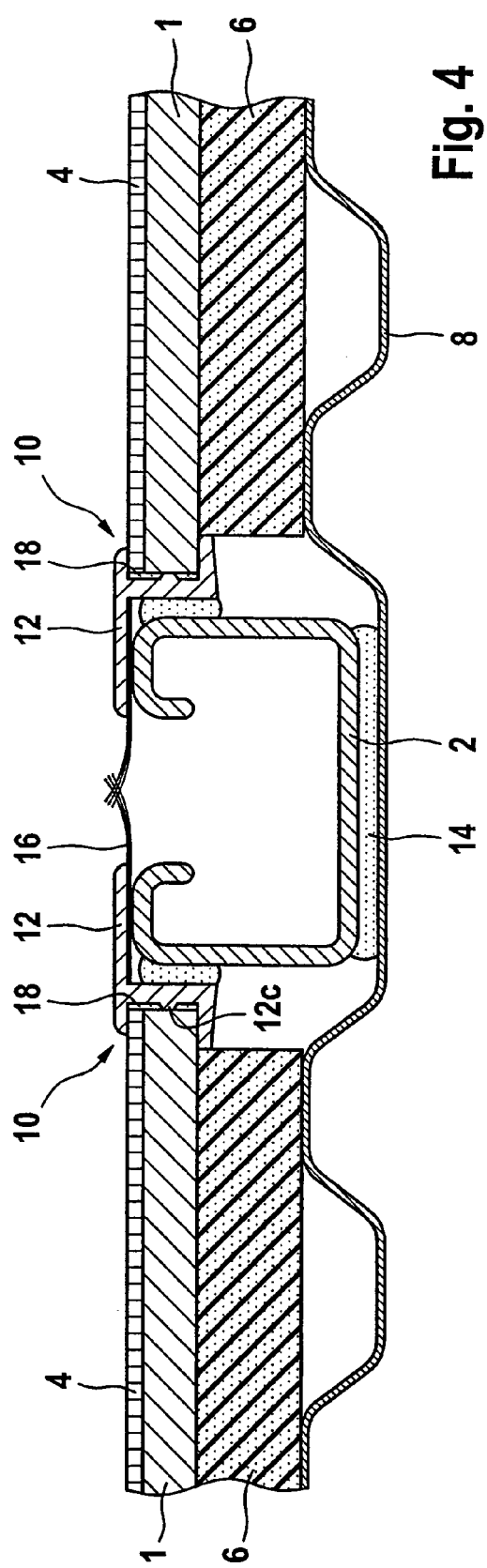

FLOOR MODULE FOR A VEHICLE

CROSS-REFERENCE TO RELATED APPLICATIONS

This application is a national stage filing of PCT/DE02/04024 filed Oct. 28, 2002 claiming priority to DE 20118424.9 filed Nov. 14, 2001,

TECHNICAL FIELD

The invention relates to a floor module for a vehicle.

BACKGROUND OF THE INVENTION

Numerous vehicle manufacturers nowadays market so-called multi-vehicles. This means that, in the case of estate cars for example, systems of rails are built into the floor, which makes it possible to exchange and remove seats and other modules, so that vehicles can be used for a variety of purposes.

At present, they work according to the following principle: first of all, rails (steel profiles or aluminum profiles) are bolted or bonded on or in the floor area of the vehicle. Floor plates made of plastics material or wood, which have to be secured against displacement, are arranged next to or between the rails. It is appropriate, in this connection, for the rails to occupy the entire length of the passenger compartment.

If the rails are shorter than the passenger compartment, the adjacent floor area must consist of a large plate with appropriate cut-outs for the rails punched out, milled out or prepared in some other way. In cases like this, handling problems occur because a large floor plate with long cut-outs for rails is relatively unstable.

In both cases, it is difficult to arrange a floor system that is optically and mechanically satisfactory at the outer sides of the rails, because the corresponding parts become very narrow.

The problem of the invention consists in providing a floor module in which the difficulties in handling the floor plates used so far no longer arise and the installation of the floor plate and rails is simplified, thus taking less time.

BRIEF SUMMARY OF THE INVENTION

This problem is solved, in accordance with the invention, by a floor module for a vehicle, with a floor plate, already cut to size and ready for installation, which is integrally connected to at least one mounting rail. The floor plate is preferably bonded to the at least one mounting rail, which may be a seat runner for mounting seats or the like.

It can be provided for the floor plate to be in one piece before being connected to the at least one mounting rail. In this case, the floor plate can have at least one slot-shaped cut-out to receive the at least one mounting rail.

Alternatively, the floor plate can consist of a plurality of elements joined together into one part by a mounting rail arranged between them in each case.

The mounting rails can be straight or curved. They can have flange-like projections for receiving an adjacent edge portion of the floor plate or an edge portion of an adjacent element thereof. The mounting rail(s) can be arranged in the transverse and/or longitudinal directions.

The floor plate can be provided, on its top side, with a floor covering, especially with velour, plastics material (thermoplastic polyolefin film, PVC or PP coating), paper impregnated with phenolic resin (screen printing), a wood material plate, a coated plate, a genuine wood coating, or a metal plate with or without embossing.

The floor plate can consist of wood material (plywood, OSB board, particle board, fiber board), plastics material or metal.

The mounting rails can be profiled and may consist of metal or plastics material, and they may consist of one or a multi-part profile.

The floor plate and mounting rail(s) are preferably bonded with an elastic adhesive. The floor plate and mounting rail(s) can be bonded with a single or two-package adhesive system.

The floor plate can be provided, on its underside, with an absorbing layer or lamination, especially made of wood, wood material, plastics material or plastics foam, wood fibber board, natural fibber board or combinations thereof (e.g. non-woven composite board).

It can be provided that electric wiring, sockets, empty tubes or other supply or installation items are installed in or on the floor plate, absorbing layer or lamination.

The invention also relates to a vehicle with a floor module of the invention. Here, it can be provided that the floor module is attached to the vehicle via the mounting rail(s). In particular, the floor module can be bolted or bonded to the vehicle at the mounting rail(s), especially to the floor panel.

BRIEF DESCRIPTION OF THE DRAWINGS

The invention will now be explained by means of various embodiments, reference being made to a drawing in which

FIG. 2 shows a variant of the floor module according to FIG. 1 with mounting rails passing right through;

FIG. 3 shows part of a cross-section through a floor module of the invention in the region of a mounting rail in the installed state;

FIG. 4 shows a view in accordance with FIG. 3 for a second embodiment;

DETAILED DESCRIPTION OF THE INVENTION

The invention is based on the idea of producing, before installation, a complete floor module ready for installation, with mounting rails or seat runners bonded in, said floor module being made from or with the floor plates or sunken floors to be fitted into a vehicle, so that the mounting rails can serve as a stabilizer for the entire floor module and are, moreover, suitable for a lifting tool as an installation aid. With this solution, it is also possible to cover very narrow parts in the edge portions, such as the entry areas.

Since, in the process of bonding to the mounting rails, the floor plate becomes water-tight vis-à-vis other materials even in the area of transition from the mounting rails to other materials, neither moisture nor dirt can penetrate, which is important for avoiding corrosion in the region of the floor panel of the vehicle.

The ready-to-install floor module of the invention makes substantial savings in manufacturing times possible. Floor modules of the invention can be used in any kind of motor vehicle (passenger cars, buses, commercial vehicles), and also in railway vehicles and aircraft.

The entire module is preferably attached via the mount for the mounting rails in and on the vehicle, which is necessary in any case.

It goes without saying that the floor module of the invention can be used not only in the construction of new vehicles but also in repairing or retrofitting vehicles.

Figure 1:
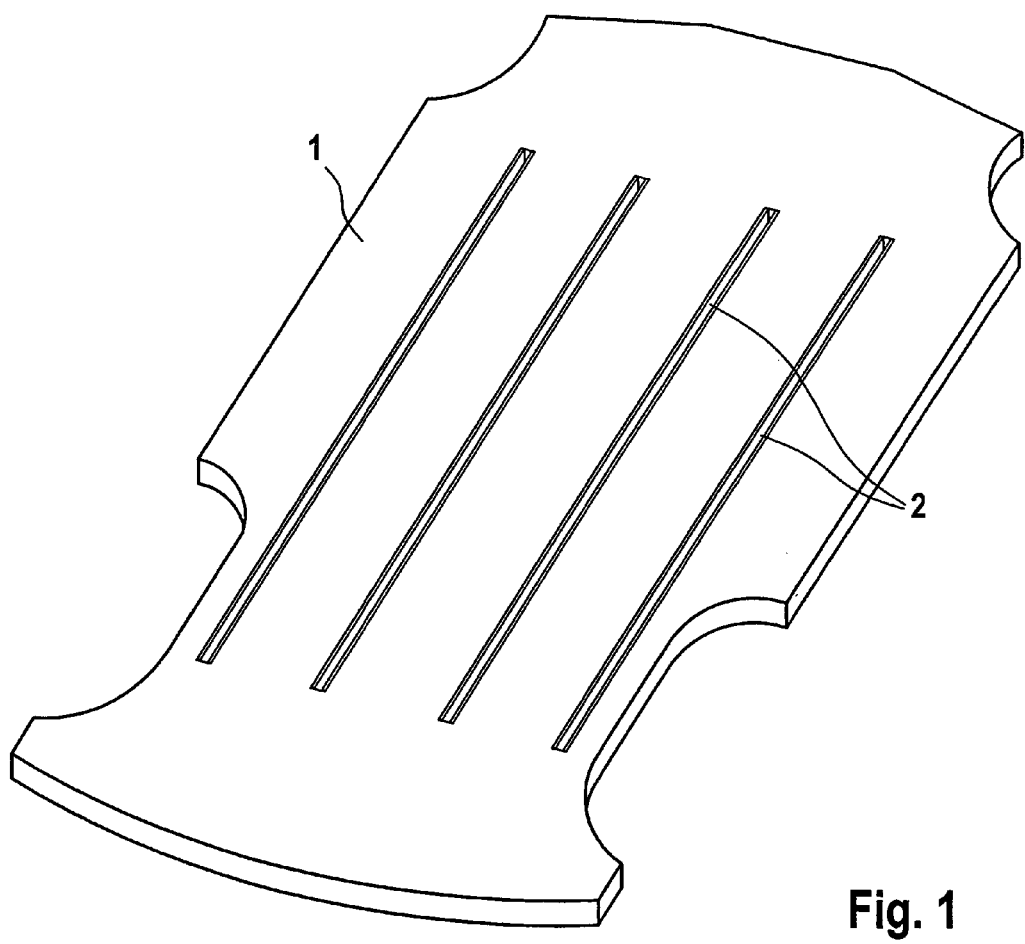
FIG. 1 shows a perspective view floor module of the invention (schematically) with mounting rails integrated.
Figure 2:
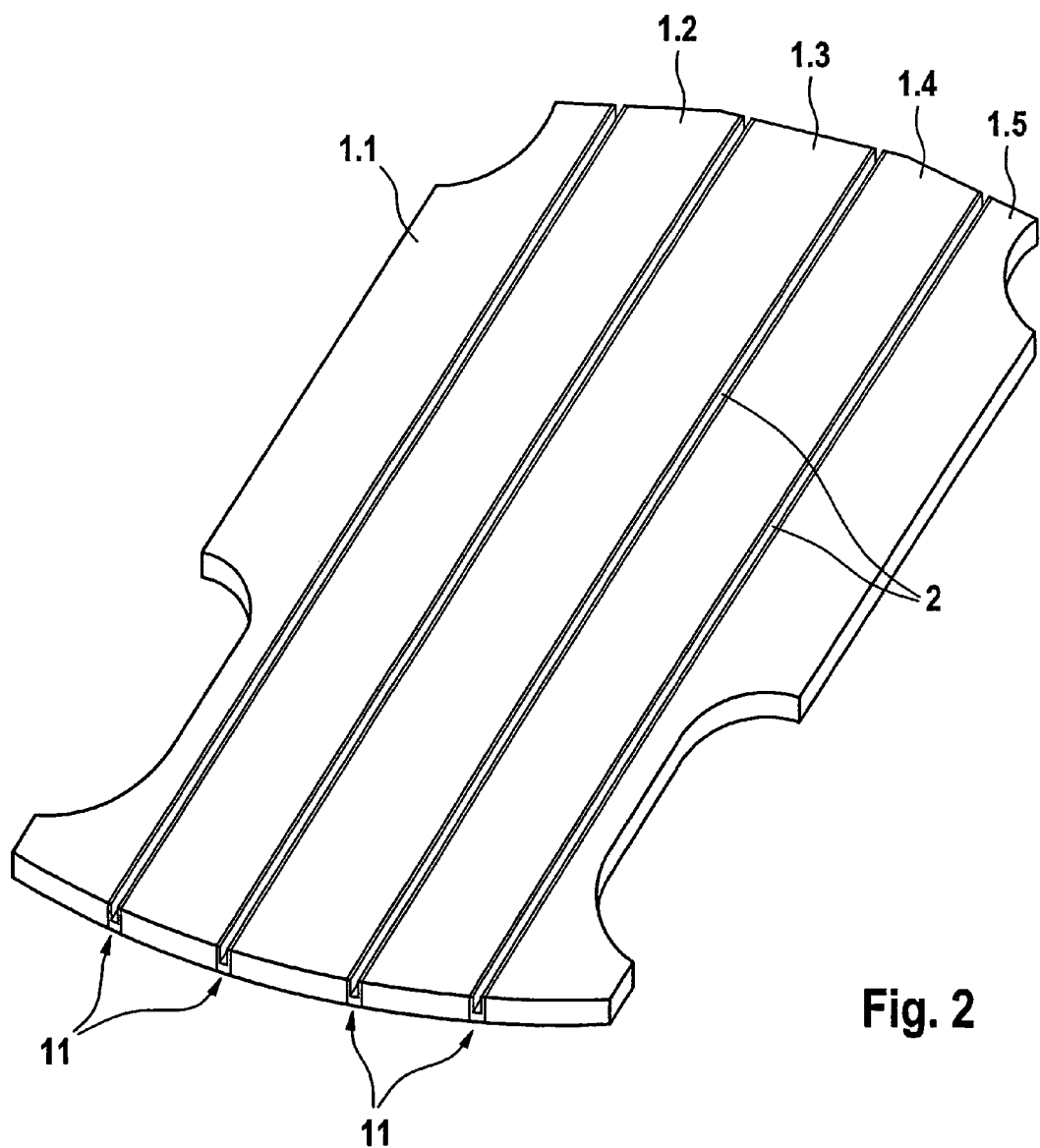

In FIGS. 1 and 2, two floor modules of the invention are shown schematically. FIG. 1 illustrates a single-part floor plate 1 cut to size ready for installation, in which a row of seat runners or mounting rails 2 have been integrated into slots 11 fitted in the floor plate in advance. As will be explained in more detail, the mounting rails 2 are bonded integrally with the floor plate 1. The embodiment according to FIG. 2 differs from the floor module shown in FIG. 1, in that the floor plate of FIG. 2 consists of a series of elements 1.1, 1.2-1.5, each of which is integrally connected together by mounting rails 2 which are arranged between them, so that a floor module in accordance with the invention is formed.

FIG. 3 shows a cross-section view through a floor module of the invention in the region of a mounting rail in the state when installed in a vehicle. The floor plate 1 in this case is covered with a floor covering 4 on its upper side, such as a carpet, and is provided on its underside with an absorbing backing layer of foamed material 6, with which the floor module rests on a floor panel 8 of the vehicle. Covering profiles 12 are clamped and adhered to lateral edge portions 10 of a slot 11 built into the floor plate and are for their part bonded to the mounting rail 2 (single or two-package adhesive 14). Disposed between the covering profiles 12 is a brush seal 16 covering the mounting rail 2.

The covering profiles 12 have flange-like projections 12a, 12b which, together with the high-strength adhesive bond between the floor plate and the covering profiles, on the one hand, and between the covering profiles and the mounting rail, on the other hand, provides a one-piece, integral and high-strength connection between the components of the floor module, so that the latter can be handled as a unit and, after insertion into the vehicle concerned, can be firmly connected to the vehicle by means of adhesive bonds between the mounting rails 2 and the floor panel 8. For the purposes of the invention, the covering profiles should be regarded as a part of the entire mounting rail 2, since the combination into a complete floor material is created in this way ("multi-part" mounting rail).

FIG. 4 shows a structure corresponding to FIG. 3, though here, in the region of the contact at the face surface, an adhesive pad 18 is provided between the covering profiles 12 and the floor plate 1; this enables the covering profiles 12 to have spacer members 12c, which ensure that there is a space between the face edge of the floor plate 1 and the opposite surface of the covering profile 12.

Figure 5:
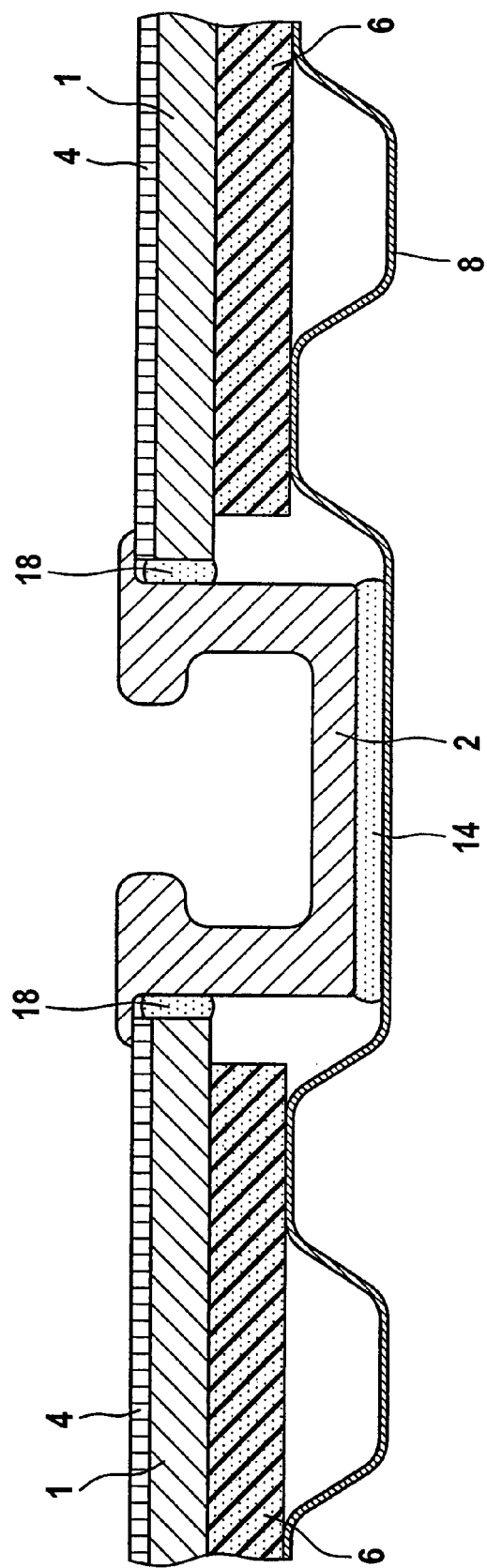
FIG. 5 shows a view in accordance with FIG. 3 for a third embodiment.
Figure 6:
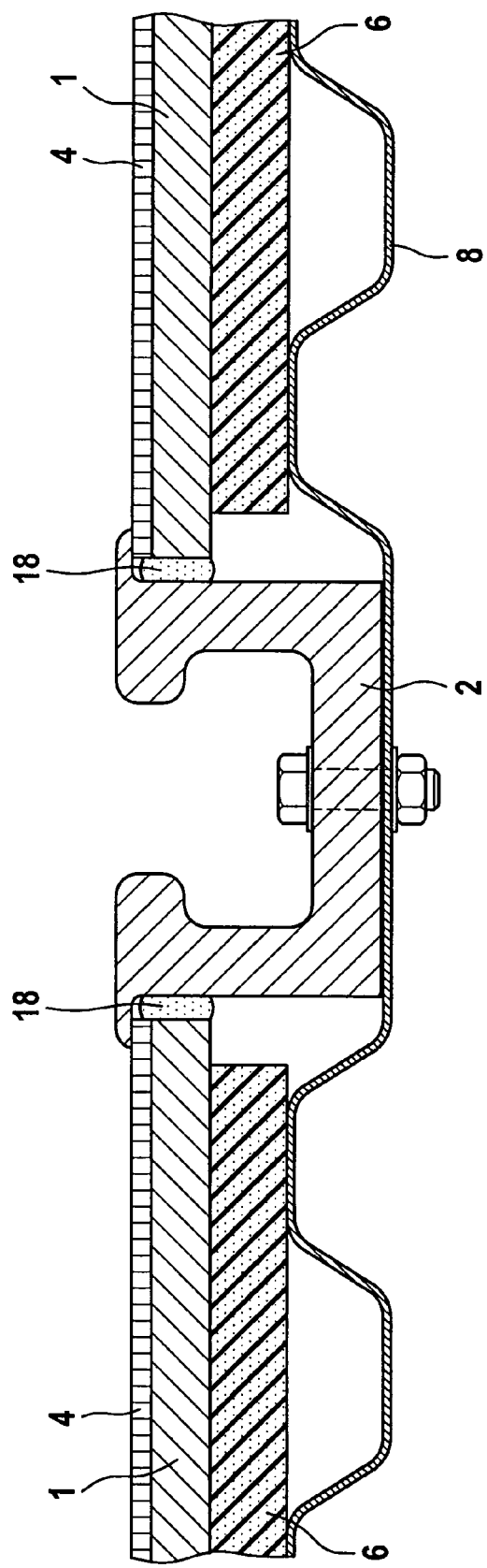
FIG. 6 shows the floor module bolted to a a floor panel of a vehicle in accordance with FIG.3 .

FIG. 5 shows an embodiment similar to FIGS. 3 and 4, though the mounting rail 2, which consisted of steel in FIGS. 3 and 4, is made of aluminum here and is designed as a single part. As FIG. 5 shows, the mounting rail 2 in this case is bonded directly to the face surfaces of the edge portions 10 of the slot in the floor plate 1, and the ready-to-install floor module is connected (bonded) to the floor panel 8 of the vehicle via the mounting rail 2.

A further advantage of the floor module of the invention is that any unevenness in the region of the floor panel is leveled out, so that no warping of the seat runners can occur, which can otherwise easily lead to the seats becoming jammed.

LIST OF REFERENCE NUMERALS

1 Floor plate
1.1, 1.2-1.5 Elements of 1
2 Mounting rail
4 Floor covering
6 Backing layer of foamed material
8 Floor panel
10 Edge portion (of 1)
12 Covering profile
12a,b Flange-like projections
12c Spacer member
14 Adhesive
16 Brush seal
18 Adhesive pad

What is claimed is:

1. A floor module for a vehicle comprising:
one or more floor plate portions; and
one or more mounting rails arranged integral to said one or more floor plate portions, said mounting rails configured to accept a removable module;
wherein said one or more floor plate portions and said one or more mounting rails are coupled such that said one or more floor plate portions and said one or more mounting rails can be handled as a single unit without any external couplings.

2. The floor module of claim 1 wherein:
each of said one or more mounting rails comprises a hollow longitudinal channel arranged to accept a removable module.

3. The floor module of claim 2 wherein:
said removable module is a seating module.

4. The floor module of claim 1 wherein:
said one or more floor plate portions consists of a single floor plate shaped to substantially fill a vehicle floor area.

5. The floor module of claim 4 wherein:
said single floor plate comprises at least one slot-shaped cut-out arranged to receive at least one of said one or more mounting rails.

6. The floor module of claim 1 wherein:
said one or more floor plate portions comprises a plurality of floor plate portions, at least two of said plurality of floor plate portions coupled to each other at least in part via said one or more mounting rails arranged between them.

7. The floor module of claim 6 wherein:
each of said one or more mounting rails comprises flange-like projections arranged to receive an adjacent edge portion of one of said one or more floor plate portions.

8. The floor module of claim 1 wherein:
said one or more mounting rails are arranged in said floor module to be in a longitudinal direction relative to said vehicle when said floor module is placed in said vehicle.

9. The floor module of claim 1 wherein:
said one or more floor plate portions comprise a floor covering arranged to face up when said floor module is placed in said vehicle.

10. The floor module of claim 9 wherein:
said one or more floor plate portions comprise an absorbing layer arranged below said floor covering.

11. The floor module of claim 1 wherein:
said one or more floor plate portions consists of material selected from the group consisting of wood, plywood, OSB board, particle board, fibre board, plastics material and metal.

12. The floor module of claim 1 wherein:
said one or more floor plate portions and said one or more mounting rails are bonded with an elastic adhesive.

13. A vehicle comprising:
a floor panel; and
a floor module comprising one or more floor plate portions and one or more mounting rails arranged integral to said one or more floor plate portions, said mounting rails configured to accept a removable module, wherein said one or more floor plate portions and said one or more mounting rails are coupled such that said one or more floor plate portions and said one or more mounting rails can be handled as a single unit without any external couplings;
wherein said floor module is coupled to said floor panel via said one or more mounting rails.

14. The vehicle of claim 13 wherein:
said floor module is shaped to substantially fill the floor area of said vehicle.

15. The vehicle of claim 13 wherein:
each of said one or more mounting rails comprises a hollow longitudinal channel arranged to accept a removable module.

16. The vehicle of claim 13 wherein:
said one or more floor plate portions consists of a single floor plate comprising at least one slot-shaped cut-out arranged to receive at least one of said one or more mounting rails.

17. The vehicle of claim 13 wherein:
said one or more floor plate portions comprises a plurality of floor plate portions, at least two of said plurality of floor plate portions coupled to each other at least in part via said one or more mounting rails arranged between them.

18. The vehicle of claim 17 wherein:
each of said one or more mounting rails comprises flange-like projections arranged to receive an adjacent edge portion of one of said one or more floor plate portions.

19. A method comprising:
arranging one or more mounting rails integral to one or more floor plate portions, said mounting rails configured to accept a removable module;
coupling, in said arranged position, said one or more floor plate portions to said one or more mounting rails such that said one or more floor plate portions and said one or more mounting rails can be handled as a single unit without any external couplings; and
coupling said single unit to a floor panel of a vehicle via said one or more mounting rails.

20. The method of claim 19 wherein said one or more floor plate portions consists of a single floor plate comprising at least one slot-shaped cut-out, said step of arranging one or more mounting rails integral to one or more floor plate portions comprising:
placing said one or more mounting rails in said at least one slot-shaped cut-outs.

21. The method of claim 19 wherein said one or more floor plate portions comprises a plurality of floor plate portions, said step of coupling said one or more floor plate portions to said one or more mounting rails comprising:
coupling at least two of said plurality of floor plate portions to each other at least in part via said one or more mounting rails arranged between them.

22. The method of claim 21 wherein each of said one or more mounting rails comprises flange-like projections, said step of arranging one or more mounting rails integral to one or more floor plate portions comprising:
arranging an adjacent edge portion of each of said one or more floor plate portions within said flange-line projections of one of said one or more mounting rails.

* * * * *